(12) United States Patent
Bernardi et al.

(10) Patent No.: US 7,133,491 B2
(45) Date of Patent: Nov. 7, 2006

(54) TRAVELING X-RAY INSPECTION SYSTEM WITH COLLIMATORS

(75) Inventors: Richard T. Bernardi, Prospect Heights, IL (US); John F. Moore, Libertyville, IL (US)

(73) Assignee: Bio-Imaging Research, Inc., Lincolnshire, IL (US)

( * ) Notice: Subject to any disclaimer, the term of this patent is extended or adjusted under 35 U.S.C. 154(b) by 28 days.

(21) Appl. No.: 10/757,779

(22) Filed: Jan. 15, 2004

(65) Prior Publication Data

US 2005/0157844 A1 Jul. 21, 2005

(51) Int. Cl.
*G01N 23/04* (2006.01)

(52) U.S. Cl. ............................... 378/57; 378/147
(58) Field of Classification Search ............... 378/57, 378/147–150, 58
See application file for complete search history.

(56) References Cited

U.S. PATENT DOCUMENTS

| | | | |
|---|---|---|---|
| 5,493,596 A * | 2/1996 | Annis | 378/57 |
| 5,748,703 A * | 5/1998 | Cosman | 378/152 |
| 6,507,025 B1 * | 1/2003 | Verbinski et al. | 250/358.1 |
| 6,711,235 B1 * | 3/2004 | Galish et al. | 378/147 |

* cited by examiner

*Primary Examiner*—Edward J. Glick
*Assistant Examiner*—Jurie Yun
(74) *Attorney, Agent, or Firm*—Fitch, Even, Tabin & Flannery

(57) ABSTRACT

An X-ray apparatus is provided for inspecting a cargo container. The apparatus includes a moveable platform with an X-ray source and X-ray detector disposed on the platform on opposing sides of a scanning zone where the scanning zone may be moved along a length of the cargo container to scan a volume of the cargo container, said X-ray source being disposed in a spaced-apart relationship with respect to the scanning zone. The X-ray apparatus also includes a precollimator disposed on the X-ray platform between the X-ray source and scanning zone, said precollimator being located proximate the scanning zone and an intermediate collimator disposed midway between the X-ray source and the precollimator, said intermediate collimator having a spaced-apart relationship with respect to the precollimator and to the X-ray source.

25 Claims, 2 Drawing Sheets

TRAVELING X-RAY INSPECTION SYSTEM WITH COLLIMATORS

FIELD OF THE INVENTION

The field of the invention relates to X-ray imaging systems and more particularly to cargo inspections systems.

BACKGROUND OF THE INVENTION

Portable X-ray inspection systems for trucks are generally known. Such systems are typically used to perform non-invasive inspection of trucks for contraband (e.g., explosives, drugs, etc.). Often an X-ray beam is directed through the truck to a set of detectors on an opposing side.

As the radiation of the X-ray beam passes through the truck, the contents of the truck attenuate the beam based upon the density of the contents. Based upon the attenuation, an image may be formed of the truck's contents. By comparing a truck's manifest with the X-ray image, law-enforcement personnel may make a determination of whether on not they have probable cause to believe that any laws have been broken.

While conventional X-ray system are effective in most situations, higher power X-ray systems are needed in some other situations. For example, a tanker full of fuel or a rail car loaded with an industrial chemical would require a relatively high power X-ray beam to penetrate the vehicle to be inspected.

The use of high power X-rays requires an increased level of shielding. However, shielding is heavy and does not significantly contribute to the overall effectiveness of the imaging system. On the other hand, without adequate shielding, people working adjacent a vehicle being inspected would suffer radiation exposure, injury and even death. Because of the importance of cargo inspection for contraband, a need exists for a more effective method of protecting personnel from X-rays during the imaging of vehicles.

SUMMARY

An X-ray apparatus is provided for inspecting a cargo container. The apparatus includes a moveable platform with an X-ray source and X-ray detector disposed on the platform on opposing sides of a scanning zone where the scanning zone may be moved along a length of the cargo container to scan a volume of the cargo container, said X-ray source being disposed in a spaced-apart relationship with respect to the scanning zone. The X-ray apparatus also includes a precollimator disposed on the X-ray platform between the X-ray source and scanning zone, said precollimator being located proximate the scanning zone and an intermediate collimator disposed midway between the X-ray source and the precollimator, said intermediate collimator having a spaced-apart relationship with respect to the precollimator and to the X-ray source.

DETAILED DESCRIPTION OF AN ILLUSTRATED EMBODIMENT

Figure 1:
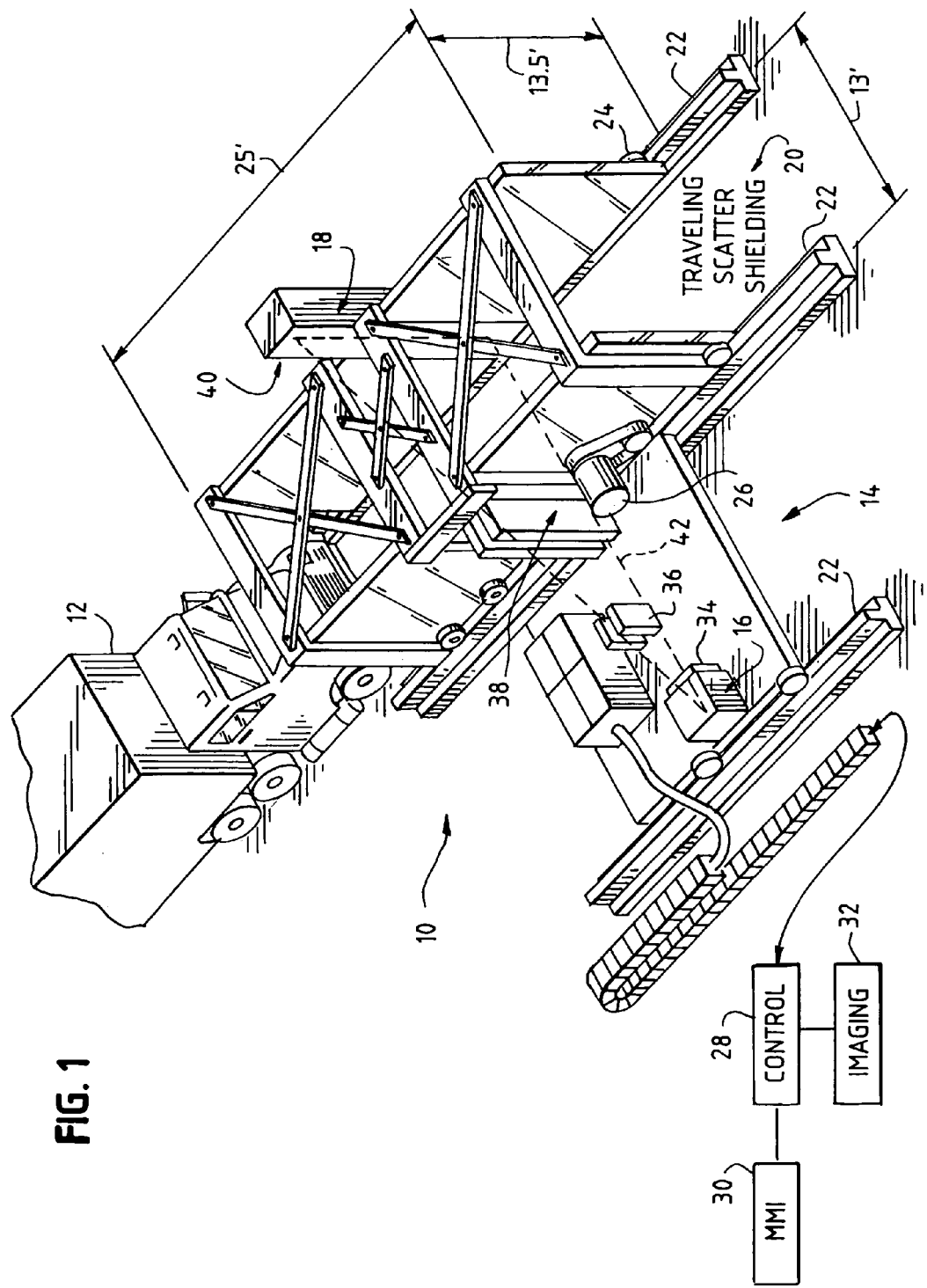
FIG. 1 is a perspective view of a mobile X-ray inspection system in accordance with an illustrated embodiment of the invention.

FIG. 1 is a perspective view of a moveable vehicle imaging and inspection system 10, shown generally in accordance with an illustrated embodiment of the invention. Included within the system 10 is a moveable platform 14 that supports an X-ray source 16 and detector assembly 18 and that scans containers located within a scanning zone 20. In use, a vehicle (e.g., a truck 12) would be moved into the scanning zone 20 and the platform 14 would be moved along the scanning zone 20 to scan a volume of the truck from one end to the other.

The platform 14 moves along the scanning zone 20 supported by tracks 22 and a set of wheels 24. A motor and drive system 26 provides the electromotive force to move the platform 14 under control of a controller 28.

The controller 28 and drive system 26 move the platform 14 at a relatively constant speed along the length of the vehicle 12. As the platform 14 moves, the controller 28 activates the X-ray source 16 and collects data from the detector 18. The data from the detector assembly 18 may be used to form a two-dimensional image of the contents of the vehicle 12.

The X-ray source 16 may be a relatively high power X-ray source (e.g. a 6 MeV Linatron made by Varian). The detectors 18 may consist of a vertical linear array of 6 MV X-ray detector elements with a pitch (center to center distance) of approximately 1.38 mm for receiving the vertical fan beam 44 of X-rays. One or more vertical columns of detectors may be used (either aligned horizontally or offset by one-half the pitch) to improve resolution. A guard band of X-ray absorbing material may be provided around the detectors to absorb X-rays that impinge on the detector assembly 18 adjacent to the X-ray detectors. The operation of the detectors in conjunction with the processor 28 and display 32 provides a digital radiographic image of the contents of the cargo container 12.

In order to reduce the shielding requirements of the imaging system 10, a number of collimators may be disposed along the X-ray path 42. In one illustrated embodiment, a source collimator 34 may be disposed in close contact with the X-ray source 16, a precollimator 38 may be disposed on the platform 14 adjacent the scanning path 20, an intermediate collimator 36 may be disposed on the platform 14 midway between the X-ray source 16 and precollimator 38 and a postcollimator 40 may be provided within the detector assembly 18.

The X-ray source 16 is shown in a spaced-apart relationship with regard to (i.e., located some distance away from) the scanning zone 20 to allow the X-ray beam 42 to expand in a vertical direction to the point where it is able to simultaneously span the full height of the cargo container. As the beam expands in the vertical direction, the beam 42 also expands in the horizontal direction.

The prior art has, for the most part, ignored the horizontal expansion and instead simply placed a collimator on the source and shielding around the detectors to absorb X-rays that are not absorbed in the detectors. The difficulty with this approach, however, is that it requires significantly more (and heavier) shielding. For example, shielding placed near the source 16 does not have to be as large as the shielding around the detector 18. The reason for this phenomenon is that the beam is much smaller near the source than it is near the detector. Therefore, a collimator near the source does not have to be as big as a collimator near the detector to absorb the same radiation. Further, by collimating the X-ray beam 42 at a number of locations along its path to the detector 18, the shielding around the detector 18 does not have to be as wide or as thick as in prior art devices.

It has also been found that adjacent, off-axis shielding may be reduced by the use of parallel shielding that form a pair of wings on either side of the collimating slots. Parallel shielding in this regard is shielding that extends parallel to the X-ray path 42 at predefined locations, as discussed below.

In effect, the collimators 34, 36, 38, 40 functions to thin the fan beam 42. Thinning the fan beam 42 minimizes the volume of cargo within the vehicle 12 that is irradiated during any instant of time thereby reducing in-plane scatter, out-of-plane scatter and dose.

Figure 2:
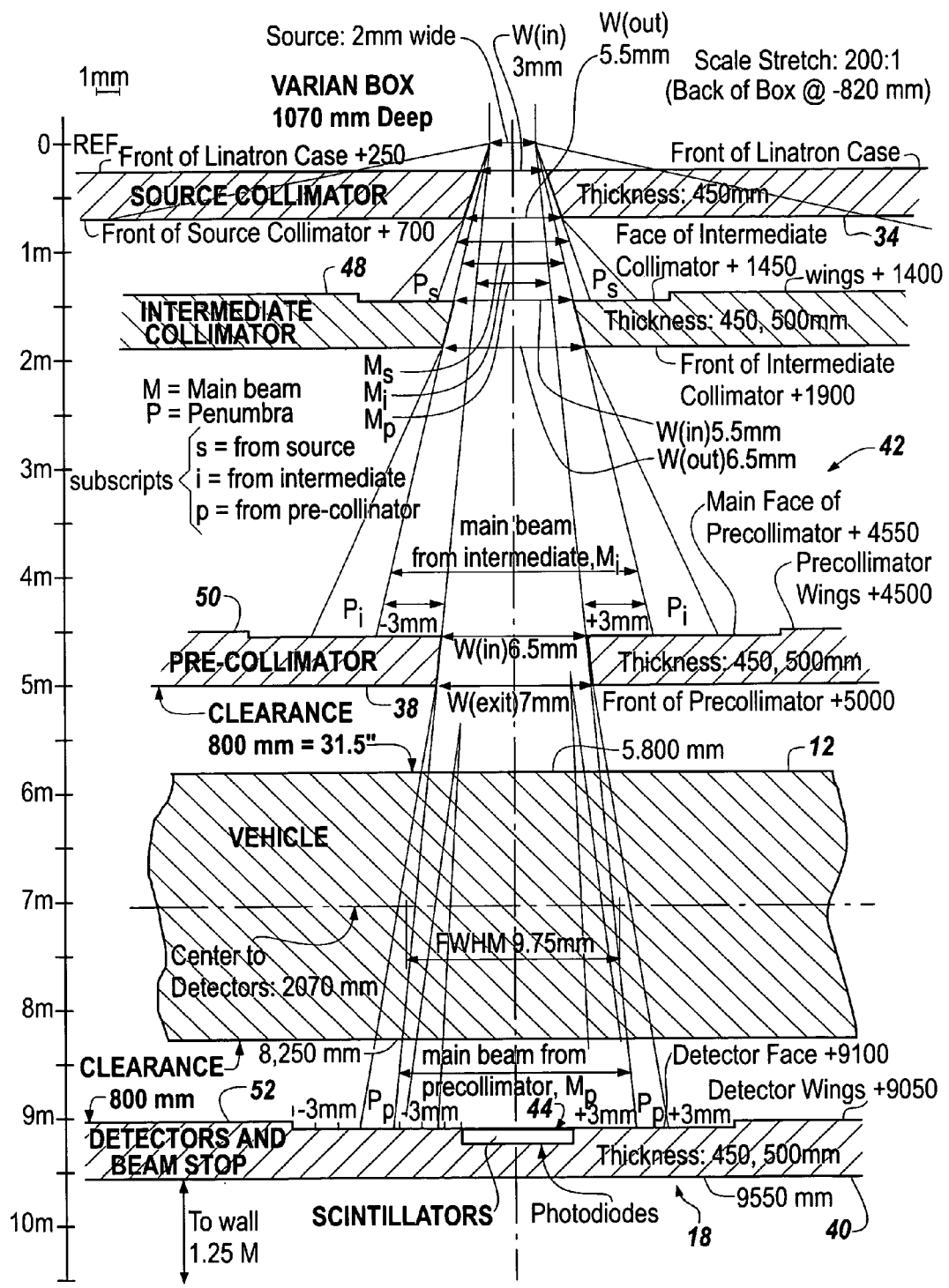
FIG. 2 to a top plan view of X-ray propagation control that may be used by the system of FIG. 1.

Turning now to the collimators 34, 36, 38, 40, an explanation will be provided of how X-ray propagation control is accomplished via use of the collimators. In this regard, FIG. 2 is a top plan view of the X-ray path 42 of FIG. 1. It should be noted that for purposes of explanation, the scale perpendicular to the X-ray path has been expanded by a ratio to 200 to 1. It should also be noted that the word "source" in FIG. 2 refers to the origin of the X-ray beam 42 within the enclosure 16 and not specifically to the enclosure 16 shown in FIG. 1.

The source collimator 34 may be conventional with an appropriate thickness (e.g., 450 mm). An aperture (i.e., a slot) of the source collimator 34 may be structured to create a fan-beam shaped X-ray envelope that diverges at an appropriate fan angle (e.g., 26.5 degrees) in a vertical direction. The vertical size of the slot of the collimator 42 may be chosen in this respect to allow the X-ray beam 44 to span an appropriate interrogation height (e.g., 11 feet) of a cargo container 12.

As shown in FIG. 2, the source collimator 34 may be located 250 mm from the source of the X-ray beam 42. The beam 42 at the source may have a horizontal width at this point of 2 mm.

A width (i.e., in the horizontal direction) at an entrance to the collimating slot of the source collimator 34 may be 3 mm. The width of the exit of the slot in the source collimator 34 may be 5.5 mm.

As shown in FIGS. 1 and 2, the intermediate collimator 36 may have a spaced apart relationship with the source collimator 34 and the precollimator 38. In the embodiment illustrated in FIG. 2, the intermediate collimator is 700 mm from the source collimator and 2600 mm from the precollimator 38. Also, as shown in FIG. 2, the intermediate collimator 36 may have a collimating slot with an entrance width of 5.5 mm and an exit width of 6.5 mm.

As the main beam $M_s$ passes through the source collimator 34, it begins to expand in the horizontal direction. In addition, the main beam $M_s$ has a penumbra $M_p$. As shown in FIG. 2, the main beam $M_s$ is approximately 2 mm wider than the entrance slot of the intermediate collimator 36. The penumbra beam $M_p$ is about 6 mm wider than the entrance slot. Since the entrance slot of the intermediate collimator 34 is narrower than the main beam $M_s$ and penumbra beam $M_p$, the beam 42 is collimated within the intermediate collimator 34 with any X-ray energy outside the slot being absorbed by the body of the collimator 36.

Similarly, the precollimator 38 may have a collimating slot with an entrance width of 6.5 mm and an exit width of 7 mm. The main beam $M_i$ from the intermediate collimator 35 is shown as having a width of 12.5 mm and the penumbra $P_i$ with a width of 18 mm.

From the precollimator 38, the X-ray beam 42 propagates through the container 12 to the detector 18. As the beam 42 passes the midpoint of the container 12, the beam 42 may have a full width at half maximum (FWHM) of 7.75 mm.

The collimator slot of the postcollimator 40 within the detector assembly 18 may be provided in the form of a recess filled with scintillating elements 44 backed by photodiodes 46. The collimating slot (i.e., the recess) in the postcollimator 40 may have a width of 5 mm. The solid area behind the photodetectors 46 (and the remainder of the body of the postcollimator 40) may form a beamstop that absorbs the remainder of the beam 42. As above, it may be noted that the main beam $M_p$ has a width of 11 mm and the penumbra $P_p$ a width of 18 mm.

The post collimator 40 functions to rejection out-of-plane scatter. The post collimator 40 also functions to define the edges of the beam more precisely than most distant collimators. This not only helps equalize signals detected by the detectors, but also protects the photodetectors by restricting the beam 42 to the portion of the scintillating elements 44 that is opposite the photodetectors.

As also shown in FIG. 2, the intermediate collimator 36, precollimator 38 and postcollimator 40 are each provided with parallel shielding in the form of a pair of wings 48, 50, 52 centered on opposing sides of the collimating slots that each extend towards the source 16. The wings 48 of the intermediate collimator 36 are shown to be 7 mm from a centerline of the collimating slot and extend 50 mm towards the source 16 (parallel to the beam 42). Similarly, the wings 50 of the precollimator 38 are shown to be 12 mm from a centerline of the collimating slot and extend 50 mm towards the source 16 (parallel to the beam 42) and the wings 52 of the postcollimator 40 are shown to be 10 mm from a centerline of the collimating slot and extend 50 mm towards the source 16 (parallel to the beam 42).

Because the pairs of wings 48, 50, 52 are long (50 mm) and relatively close together (i.e., less than 12 mm apart), the wings 48, 50, 52 have been found to be effective in intercepting and extinguishing most of the backscatter from their respective collimators. The backscatter that escapes the wings 48, 50, 52 is directed towards the source 16 with an angle of no more than 13 degrees from the axis of beam travel.

It may be noted from FIG. 2 that the impinging main beam $M_s$, $M_i$, $M_p$, of a previous collimator is, in all cases, wider than a subsequent collimator. For example, the main beam $M_s$ from the source collimator 34 is 3 mm wider than the collimating slot of the intermediate collimator 36, the main beam $M_i$ from the intermediate collimator 36 is 3 mm wider than the collimating slot of the precollimator 38 and the main beam $M_p$ from the precollimator 38 is 3 mm wider than the collimating slot of the postcollimator 40. The extra width of the main beam into each collimator may be provided to accommodate misalignment of the collimators 34, 36, 38, 40 with respect to the path 42 of the beam caused by thermal expansion or assembly misalignments. The same 3 mm may also be provided between the edges of the penumbra and the wings 48, 50, 52 for the same reason.

In general, the use of multiple collimators 34, 36, 38, 40 allows the size of the individual collimators 34, 36, 38, 40 to be smaller and lighter. Since the intermediate collimator 36 is closer to the source 16 than the precollimator 38, the intermediate collimator may be proportionately shorter in height than the precollimator 38 and postcollimator 40. Further, the horizontal collimation of the successive collimators allows the width of each collimator 36, 38, 40 to be significantly reduced.

For example, the source collimator 34 because of its association with the X-ray source 16 may have an overall width of about 12 inches (i.e., six inches (152 mm) on either side of the centerline of the beam 42). The intermediate collimator 36 and precollimator 38 may have an overall width of about 6 inches (i.e., 3 inches (76.2 mm) on either side of the centerline of the beam 42).

Similarly, the postcollimator 40 may be relatively narrow and use a tapering arrangement. For example, the wings 52 of the postcollimator 40 may have a thickness of 500 mm for a distance that extends up to 10 inches (254 mm) on either side of the centerline of the beam 42. After 10 inches, the thickness of the beamstop portion of the postcollimator 40 may be proportionately reduced based upon the geometry of impinging X-rays. For example, if X-ray energy were to enter at a 45 degree angle, then the thickness of the beamstop need be no more than 70% of the thickness of the central portion of the beamstop.

It should be noted that the dimensions shown in FIG. 2 are exemplary only. Other X-ray systems may be provided with the same functionality of the system described above by using the same proportionality factors set forth in the description and drawings. For example, the distance separating the wings 48, 50 of the intermediate collimator 36 and precollimator 38 may be approximately one-percent of the distance to the X-ray source 16. Similarly, a proportionality factor may be established that relates the widths of the collimating slots of the source collimator 34, the intermediate collimator 36, the precollimator 38 and the postcollimator 52.

In addition, the use of multiple collimators allows the overall width of the individual collimators to be proportionately reduced. For example, the intermediate collimator 36 need only have a horizontal width (perpendicular to beam travel) of about 6% of less of the distance to the X-ray source. Simlarly, the precollimator need only have a horizontal width of about 2% or less of the distance to the X-ray source.

A specific embodiment of a mobile apparatus for inspecting cargo according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention, any and all modifications, variations, or equivalents that fall within the true spirit and scope of the basic underlying principles disclosed and claimed herein.

The invention claimed is:

1. An X-ray apparatus for inspecting an object, such apparatus comprising:
    an X-ray source and X-ray detector disposed on opposing sides of a scanning zone, said X-ray source being disposed in a spaced-apart relationship with respect to the scanning zone;
    a first collimator that is disposed between the X-ray source and the scanning zone and that is located proximate the X-ray source, wherein the first collimator is in addition to any collimator that is integral to the X-ray source;
    a precollimator disposed between the first collimator and the scanning zone, said precollimator being located proximate the scanning zone; and
    at least one intermediate collimator disposed between the first collimator and the precollimator, said intermediate collimator having a spaced-apart relationship with respect to the precollimator and the first collimator and being substantially stationary with respect to the precollimator.

2. The X-ray apparatus as in claim 1 wherein the intermediate collimator further comprises a pair of wings for intercepting backscatter operatively extending from opposing sides of a collimating slot of the intermediate collimator towards the X-ray source.

3. The X-ray apparatus as in claim 2 wherein the pair of wings further comprises a mounting position that is set back from a center line of a collimating entrance of the intermediate collimator by a distance such that the pair of wings intercept at least a portion of an X-ray beam penumbra from a previous collimator.

4. The X-ray apparatus as in claim 3 wherein the pair of wings has a thickness that is sufficient to block at least a substantial majority of radiation that is scattered from an intermediate collimator surface that faces the X-ray source.

5. The X-ray apparatus as in claim 2 wherein the intermediate collimator further comprises an overall width that is at least equal to a collimating entrance of the intermediate collimator, plus twice a setback of the pair of wings, plus twice a thickness of the pair of wings.

6. The X-ray apparatus as in claim 1 wherein the precollimator further comprises a pair of wings for intercepting backscatter operatively extending from opposing sides of a collimating slot of the precollimator towards the X-ray source.

7. The X-ray apparatus as in claim 6 wherein the set back of the pair of wings from the centerline of the collimating entrance of the precollimator further comprises a distance between the wings such that the pair of wings at least substantially intercept a penumbra of an X-ray beam from a previous collimator.

8. The X-ray apparatus as in claim 1 wherein the precollimator further comprises a pair of wings for intercepting backscatter operatively extending from opposing sides of a collimating slot of the precollimator towards the X-ray source and wherein the precollimator has an overall width that is at least equal to a collimating entrance of the precollimator, plus twice a setback of the pair of wings, plus twice a thickness of the pair of wings.

9. The X-ray apparatus as in claim 8 wherein the setback of the pair of wings further comprises a distance between edges of the X-ray beam and the pair of wings to thereby accommodate misalignment of the precollimator.

10. The X-ray apparatus as in claim 1 wherein the detector further comprises a postcollimator that supports a set of detector elements, said postcollimator further comprising a pair of wings for intercepting backscatter operatively extending from opposing sides of a front face of the set of detectors towards the X-ray source.

11. The X-ray apparatus as in claim 10 wherein the postcollimator further comprises a pair of wings for intercepting backscatter operatively extending from opposing sides of a collimating slot of the postcollimator towards the X-ray source and wherein the set back of the pair of wings from the centerline of the collimating entrance of the postcollimator further comprises a distance such that the pair of wings at least substantially intercept an X-ray beam penumbra from a previous collimator.

12. The X-ray apparatus as in claim 11 wherein the setback of the pair of wings further comprises a distance between edges of the X-ray beam and the pair of wings to thereby accommodate misalignment of the postcollimator.

13. The X-ray apparatus as in claim 1 wherein the first collimator comprises a source collimator that is disposed adjacent but not integral to the X-ray source.

14. The X-ray apparatus as in claim 13 wherein the source collimator further comprises a collimating slot with an entrance having a width that is approximately one percent of a distance from a point of origin of X-rays from the X-ray source to the entrance of the source collimator.

15. The X-ray apparatus as in claim 14 wherein the source collimator further comprises a collimating slot with an exit having a width that is less than one percent of a distance from the point of origin of the X-ray source to the exit of the source collimator.

16. The X-ray apparatus as in claim 1 wherein the intermediate collimator further comprises a collimating slot with an entrance having a width that is less than one-half percent of a distance from the X-ray source to the entrance of the intermediate collimator.

17. The X-ray apparatus as in claim 16 wherein the intermediate collimator further comprises the collimating slot with an exit having a width that is about one-third percent of a distance from the X-ray source to the exit of the source collimator.

18. The X-ray apparatus as in claim 1 wherein the precollimator further comprises a collimating slot with an entrance having a width that is about one-tenth percent of a distance from the X-ray source to the entrance of the precollimator.

19. The X-ray apparatus as in claim 18 wherein the precollimator further comprises the collimating slot with an exit having a width that is larger than the entrance.

20. The X-ray apparatus as in claim 1 wherein the precollimator further comprises a collimating slot with an entrance having a width that is about 0.05 percent of a distance from the X-ray source to the entrance of the precollimator.

21. The X-ray apparatus as in claim 1 wherein the first collimator further comprises a collimating slot having an exit having a width that is larger than an entrance to the collimating slot.

22. The X-ray apparatus as in claim 1 wherein the intermediate collimator further comprises a collimating slot having an exit having a width that is larger than an entrance to the collimating slot.

23. A method for inspecting an object, such method comprising the steps of:
   providing an X-ray source and X-ray detector on opposing sides of a scanning zone, said X-ray source being disposed in a spaced-apart relationship with regard to the scanning zone;
   disposing a first collimator proximal to the X-ray source and between the X-ray source and the scanning zone;
   disposing a precollimator between the first collimator and the scanning zone, said precollimator being located proximate the scanning zone;
   disposing an intermediate collimator between the first collimator and the precollimator, which intermediate collimator is stationary with respect to the first collimator; and
   inspecting the object by transmitting an X-ray beam from the X-ray source to the X-ray detector using the first collimator, the intermediate collimator and the precollimator to control expansion and scatter of the X-ray beam.

24. The method as in claim 23 further comprising providing a pair of wings on opposing sides of a collimator slot of the intermediate collimator to control backscatter.

25. The method as in claim 23 further comprising providing a pair of wings on opposing sides of a collimator slot of the precollimator to control backscatter.

* * * * *